United States Patent [19]

Haraikawa

[11] 4,086,986
[45] May 2, 1978

[54] FLOATING CALIPER-TYPE DISC BRAKE

[75] Inventor: Tetsuo Haraikawa, Funabashi, Japan

[73] Assignee: Tokico Ltd., Kawasaki, Japan

[21] Appl. No.: 713,035

[22] Filed: Aug. 10, 1976

[30] Foreign Application Priority Data

Aug. 14, 1975 Japan .................................. 50-98826

[51] Int. Cl.² ............................................. F16D 55/224
[52] U.S. Cl. ..................................................... 188/73.3
[58] Field of Search .................... 188/73.3, 73.4, 73.5, 188/73.6, 72.4

[56] References Cited

U.S. PATENT DOCUMENTS

| | | | |
|---|---|---|---|
| 3,656,590 | 4/1972 | Newstead | 188/73.3 X |
| 3,682,277 | 8/1972 | Brown | 188/73.3 |
| 3,735,843 | 5/1973 | Wiig | 188/73.3 X |
| 3,881,576 | 5/1975 | Haraikawa et al. | 188/73.5 |

*Primary Examiner*—George E. A. Halvosa
*Attorney, Agent, or Firm*—Schmidt, Johnson, Hovey & Williams

[57] ABSTRACT

A floating caliper disc brake is provided with an improved device for shiftably mounting the housing on the support and for transmitting the lateral forces exerted on the housing during braking to the support, which is entirely independent of the relationship between the bolts interconnecting the caliper portions of the housing and the holes in the support through which they pass. Such bolts merely pass through the holes in the support loosely, so that the lateral forces generated by braking will not distort or bend such bolts and thereby also distort the housing or cause binding between the shiftable housing and the support. The improved housing mounting and force-transmitting device employs a pair of sleeve-like cylindrical guide projections oppositely extending from the sides of the support for each of the holes in the latter and respectively coaxial with such holes, and a pair of opposed cylindrical guide cavities in each of the spaced caliper portions of the housing and respectively coaxial with the holding bolts of the housing. Each of such projections is slidably received in a corresponding cavity to provide the required shiftable mounting of the housing upon the support and the required transmission of lateral forces generated by braking from the housing to the support, without damage to the housing or its caliper connecting bolts or malfunctioning due to binding.

1 Claim, 2 Drawing Figures

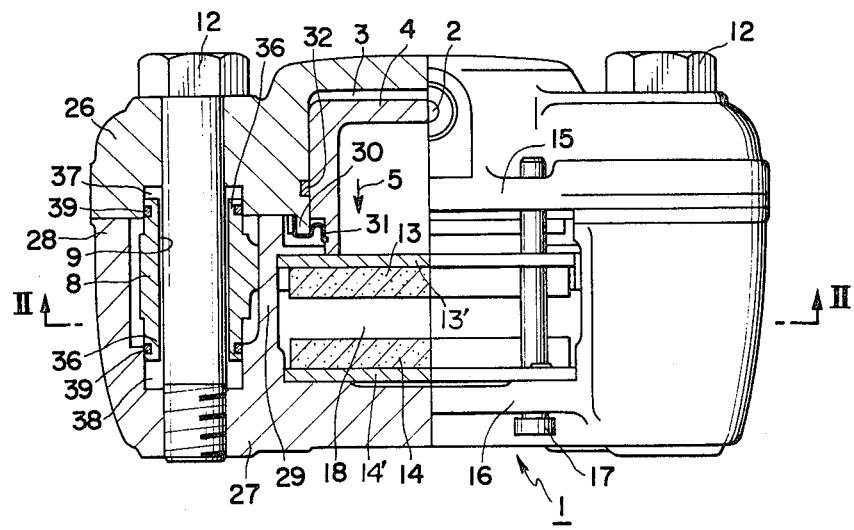
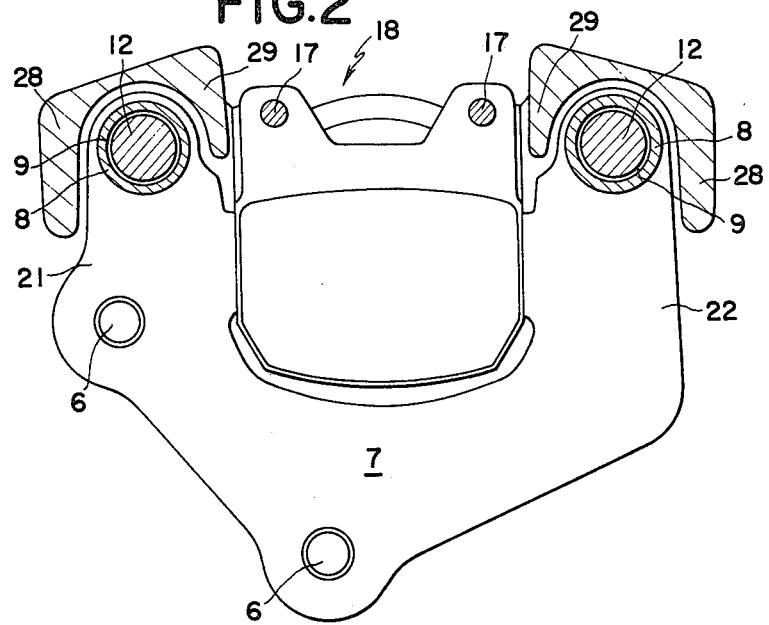

FLOATING CALIPER-TYPE DISC BRAKE

This invention relates to a floating caliper-type disc brake and more particularly to a floating caliper-type disc brake in which the outer surface of ears on a support member is fitted in the inner surface of a housing receiving the ears whereby the brake is applied, the housing is slidably guided along the outer surface of the support ears.

There have been proposed and practically employed a variety of floating caliper-type disc brakes and in one of the prior art floating caliper-type disc brakes, the engagement between the caliper and support was effected by means of slide bolts fixedly secured at the opposite ends to the caliper and slidably fitted on the center portion of the bolts in through holes in the upper portion of the support. When the disc brake was applied, the caliper was slidably guided within the through holes in the support by means of the outer surface of slide bolts. Thus, in the prior art floating caliper-type disc brake described hereinabove, in order to smoothly and positively operate the disc brake, it is required that the entire slidable portion of the bolt have a uniform diameter, that the bolt be precisely finished, that the bolt be free of bent and twisted portions and that the material of the bolt be homogenous. Furthermore, as well known in the art, since the bolt is subjected to forces in the tensioning and bending directions, the bolt is required to have a rigidity sufficient to bear against such forces.

Furthermore, in the prior art floating caliper-type disc brake, a portion of the sliding face of the slide bolt projects out of the hole in the support and flying stones and the like frequently strike against the projecting sliding face portion to damage the projecting portion. In a certain type disc brake, in order to prevent such accident, a boot covered the projecting portion of the sliding face of the slide bolt to protect the projecting portion against possible damage. However, such protection means proved not to be effective enough to prevent occurrence of such accident.

Therefore, the present invention is to eliminate the disadvantages inherent in the prior art floating caliper-type disc brakes referred to hereinabove. For the purpose, according to the present invention, the sliding function of the prior art slide bolt is performed by the sliding engagement between the outer surface of the upper portion of the support and the inner surface of the support so that the bolt is not directly subjected to force in the bending direction. Therefore, the slide bolt is not required to have the function as the slide means referred to hereinabove, but only the function as the tension means for the housing. To discuss this fact further, in case of the so-called dividable housing, in order to integrally support the housing portions together, a bolt or bolts which have the function as the tension means are required. In case of the undividable or one piece housing, no bolt is required because the housing has been inherently formed as an integral structure.

Furthermore, according to the present invention, since the sliding faces are formed by the outer surface of the upper portion of the support and the opposed inner surface of the support receiving inner surface of the housing all of which are perfectly isolated from the exterior, there are no surfaces which are vulnerable to damage by flying stones and the like. Thus, the problem relating to damage of the sliding faces due to flying stones and the like has been perfectly solved. This sliding face protection aspect will be further improved by providing protective ring boots on the sliding faces for protection against invasion of foreign materials onto the sliding faces.

The above and other objects and attendant advantages of the present invention will be more readily apparent to those skilled in the art from a reading of the following detailed description in conjunction with the accompanying drawing in which one preferred embodiment of floating caliper-type disc brake of the invention is shown for illustration purpose only, but not for limiting the scope of the same in any way.

FIG. 1 is a top plan view of one preferred form of floating caliper-type disc brake constructed in accordance with the present invention showing a portion thereof in section; and FIG. 2 is a side elevational view in partial section taken along substantially the line II—II of FIG. 1.

The present invention will be now described referring to the accompanying drawing in which one preferred embodiment of floating caliper-type disc brake of the invention is shown and the disc brake generally comprises a housing or caliper 1 which consists of first and second housing portions 26 and 27. The first housing portion 26 defines a cylinder 3 therein and the second housing portion 27 is positioned in face-to-face abutment relationship to the first housing portion 26. The first and second housing portions 26 and 27 are connected together in face-to-face abutment relationship by means of spaced and parallel bolts 12, 12 which extend through the housing portions and are set in position by nuts to form the housing 1. The thus formed housing 1 has an opening 18 in the center of the upper portion thereof for receiving a portion of a rotary disc therein. The housing 1 is formed with opposed and spaced abutment walls 28 and 29 on the outer and inner sides of each of the bolts 12, 12 where the housing portions 26, 27 are connected together in face-to-face abutment relationship to uniformly distribute fastening force on the abutment faces of the housing portions. As shown in FIG. 1, horizontally extending portions 8, 8 on the two arms 21, 22 of a substantially Y-shaped vertical support 7 are loosely mounted on the bolts 12, 12 in an intermediate portion between the opposite ends of the respectively associated bolts and the support is adapted to be fixedly secured to a stationary part of a vehicle (not shown) by means of suitable fastning means (not shown) which extend through mounting holes 6 formed in the support 7. Each of the horizontally extending portions 8, 8 of the support 7 is formed at the axially opposite ends with ears 36, 36 which are slidably received within axially spaced ear receiving recesses 37, 38 formed in the abutment walls 28, 29 of the housing portions 26, 27, respectively. The ears 36 are preferably formed integrally with the arm portions 8 of the support 7 and are preferably in the nature of sleeve-like cylindrical guide projections upon the arm portions 8, while the recesses 37, 38 are preferably in the form of cylindrical guide cavities in the caliper portions 26, 27 of the housing 1.

Disposed within the opening defined by the left- and right-hand arms 21, 22 of the support 7 in opposed relationship to the adjacent surface of a brake disc (not shown) is a first friction pad 13. A piston 4 is slidably received within the cylinder 3 defined in the housing portion 26 and adapted to make contact with the outer surface of the friction pad 13. A second friction pad 14 is mounted on the housing portion 27 in a conventional manner in opposed relationship to the inner surface of the first friction pad 13 embracing the brake disc in cooperation with the first friction pad. The friction pads 13, 14 have the backing plates 13', 14' mounted on the outer surface, respectively. The upper portion of each of the backing plates 13', 14' is formed with spaced holes for loosely receiving slide pins 17, 17 which are received in ribs 15, 16 formed with the housing portions 26, 27, respectively so that the friction pad assemblies 13, 13'; 14, 14' slidably move along the slide pins 17, 17 in a conventional manner. The slide pins 17, 17 can be removed from the housing portions 26, 27 so that the friction pad assemblies can be easily taken out of and reinserted into the opening 18 in the housing 1.

The leading or free end of the flange 30 of the housing portion 26 where the cylinder 3 is formed is provided with a dust boot 31 in a conventional manner to prevent dust and other foreign materials from entering the cylinder 3 and a conventional annular seal 32 is received in an annular recess formed in the side wall defining the cylinder 3. Similarly, ring boots 39 are received in annular recesses formed in the outer periphery of the ears 36 of the support 7 to prevent dust and other foreign materials from invading onto the frictional faces of the ears of the support and of the ear receiving recesses 37, 38 in the housing portions 26, 27.

With the above construction and arrangement of the parts of the floating caliper-type disc brake of the invention, in operation, a metered amount of oil is supplied from a suitable source of oil supply under pressure (not shown) through an oil supply hole 2 formed in the upper portion of the housing 1 into the cylinder 1.

When entering the cylinder 3, the pressure of the incoming oil drives the piston 4 toward the brake disc in the arrow direction 5 so as to apply the friction pad 13 against the associated surface of the disc whereupon a reaction force is generated. The thus generated reaction force causes the inner surface of the ear receiving recesses 37, 38 in the housing 1 to be frictionally guided along the outer surface of the ears 36, 36 on the horizontal portions 8, 8 of the support 7 whereby the entire housing 1 is then moved in the direction opposite to the arrow direction 5 with respect to the support 7. In this way, the first friction pad 13 is directly applied against one surface of the disc by the piston 4 and the second friction pad 14 is indirectly applied against the other surface of the disc as the second friction pad slidably moves along the slide pins 17, 17 together with the housing 1 under the reaction force generated by the movement of the piston 4 for applying the second friction pad against the disc whereby the disc can be suitably braked.

As mentioned hereinabove, according to the present invention, the bolts 12, 12 are loosely received within the holes 9, 9 in the horizontal portions 8, 8 on the arms 21, 22 of the support 7 and do not apply any restrictive action on the movement of the housing 1 when the housing 1 is moved in the direction opposite to the arrow direction 5 under the pressure of oil, but merely act to maintain the housing portion 26, 27 in abutment and connected condition and the housing 1 is slidably guided along the outer surface of the ears on the horizontal portions of the arms of the support. This arrangement of the bolts and housing is different from that of the corresponding parts of the prior art floating caliper-type disc brake. With the improved arrangement of the bolts and housing in the floating caliper-type disc brake of the invention, the bolts are relieved of the severe requirements imposed when the bolts should concurrently serve as slide means and tension means as seen in the prior art floating caliper-type disc brake and instead the bolts are required to merely perform their primary function as fastening means. According to the present invention, the function imposed on the bolts by the slide means in the prior art floating caliper-type disc brakes is undertaken by the interface between the outer surface of the ears on the support and the inner surface of the ear receiving recesses in the housing. That is, in the floating caliper-type disc brake of the present invention, the two functions imposed upon the slide bolts in the prior art floating caliper-type disc brakes are separately imposed on the slide bolts on one hand and on the interface between the ears on the support and the ear receiving recesses in the housing on the other hand, respectively, to lighten the burden imposed upon the slide bolts whereby general purpose bolts can be employed in the floating caliper-type disc brake of the invention. And as mentioned hereinabove, when the housing has a unitary or one piece construction, the bolts can be eliminated.

Furthermore, according to the present invention, the sliding surfaces of the housing and support are moved to the interface between the ear receiving recesses in the housing and the ears on the support from the interface between the outer surface of the bolts and the inner surface of the holes in the upper portion of the housing as seen in the prior art floating caliper-type disc brakes. This fact perfectly eliminates the disadvantage inherent in the prior art floating caliper-type disc brake that flying stones and the like strike against the sliding outer surface of the bolts to damage the sliding surface resulting in impeding smooth operation of the brake. The reason is that in the floating caliper-type disc brake of the present invention, the sliding face is formed on the outer surface of the ears on the support which ears are positioned in a location in the housing deeper than the location of the bolts in the prior art floating caliper-type disc brakes and perfectly surrounded by the ear receiving recesses in the housing. In order to further improve the effectiveness obtainable by the novel arrangement of the present invention, ring boots are preferably provided on the ears. And it will be apparent to those skilled in the art that the effectiveness will be further improved by connecting the abutment walls 28, 29 together at the lower ends to form a unitary cylindrical wall.

While only one embodiment of the invention has been shown and described in detail it will be understood that the same is for illustration purpose only and not to be taken as a definition of the invention, reference being had for this purpose to the appended claims.

What is claimed is:

1. In a floating caliper disc brake including:
   a pair of brake pads for respectively engaging corresponding zones on opposite sides of a disc to be braked;
   a fixed support having a pair of spaced arm portions each provided with a hole therethrough;
   a housing having a pair of spaced caliper portions and intermediate spacing structure therebetween presenting a chamber therewithin for receiving said pads;
   a pair of bolts in tension extending between said caliper portions and arranged for passing through said holes of said support for holding said caliper portions toward each other;

means for shiftably mounting said housing on said support with said caliper portions on opposite sides of said disc and for transmitting lateral forces exerted upon said housing during braking to said structure;

means for mounting each of said pads upon a corresponding caliper portion in facing relationship to said zone of the corresponding side of said disc for the transmission of braking torque to said caliper portion; and means for shifting one of said pads relative to the caliper portion upon which it is mounted and into forceful engagement with the corresponding zone of said disc and for thereby shifting said housing relative to said support and shifting the other of said pads into opposing forceful engagement with the other of said zones of said disc;

the improvement of which brake comprises:

said holes being of substantially larger transverse dimensions than said bolts, whereby said bolts pass loosely through said holes and serve only as tension members interconnecting said caliper portions, said housing mounting and force-transmitting means being structurally and functionally independent of said bolts and said holes, said housing mounting and force-transmitting means comprising guide projection means on said support adjacent said holes slideably received within cooperating guide cavity means in said housing adjacent said bolts, said cavity means including a cylindrical cavity in each of said caliper portions respectively for each of said bolts respectively, each of said cavities having its inner surface substantially coaxial with the corresponding bolt and spaced away from the latter, said projection means including a pair of cylindrical sleeve-like structures extending oppositely from the opposite sides of said support for each of said holes respectively, each of said structures having its inner surface loosely circumscribing the corresponding bolt and its outer surface slideably received in the corresponding cavity of the adjacent caliper portion, said projection means being formed as integral portions of said support.

* * * * *